(12) United States Patent
Arakane et al.

(10) Patent No.: US 12,502,886 B2
(45) Date of Patent: Dec. 23, 2025

(54) RECORDING APPARATUS

(71) Applicant: BROTHER KOGYO KABUSHIKI KAISHA, Nagoya (JP)

(72) Inventors: Satoru Arakane, Nagoya (JP); Shota Morikawa, Nagoya (JP); Tomoya Kondo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 266 days.

(21) Appl. No.: 18/486,516

(22) Filed: Oct. 13, 2023

(65) Prior Publication Data
US 2024/0173970 A1    May 30, 2024

(30) Foreign Application Priority Data

Nov. 30, 2022    (JP) ................................ 2022-191285

(51) Int. Cl.
    *B41J 2/045*      (2006.01)
    *B41J 2/21*      (2006.01)

(52) U.S. Cl.
    CPC ....... *B41J 2/04551* (2013.01); *B41J 2/04586* (2013.01); *B41J 2/21* (2013.01)

(58) Field of Classification Search
CPC ...... B41J 2/04586; B41J 2/04551; B41J 2/21; B41J 2/04593; B41J 2/04591; B41J 2/04508; B41J 2/04535
See application file for complete search history.

(56) References Cited

U.S. PATENT DOCUMENTS

2005/0024407 A1\*   2/2005   Kawatoko .............. B41J 2/2132
                                                                                                  347/15
2009/0128838 A1   5/2009   Yamamoto

FOREIGN PATENT DOCUMENTS

JP      2009-141941 A      6/2009

\* cited by examiner

*Primary Examiner* — Thinh H Nguyen
(74) *Attorney, Agent, or Firm* — Merchant & Gould P.C.

(57) ABSTRACT

There is provided a recording apparatus including: a recording part configured to perform, with a recording material, a recording of an image with respect to a recording medium; and a controller configured to control the recording part in a plurality of modes. The plurality of modes includes a first mode and a second mode. The controller is configured to adjust an amount of the recording material to be used at a time of the recording in the second mode. An adjustment width in a direction of decreasing the amount of the recording material in the first mode is smaller than an adjustment width in the direction of decreasing the amount of the recording material in the second mode.

7 Claims, 6 Drawing Sheets

VERTICAL DIRECTION
PAPER WIDTH DIRECTION
CONVEYING DIRECTION

⊗ VERTICAL DIRECTION  ↔ PAPER WIDTH DIRECTION  ↓ CONVEYING DIRECTION

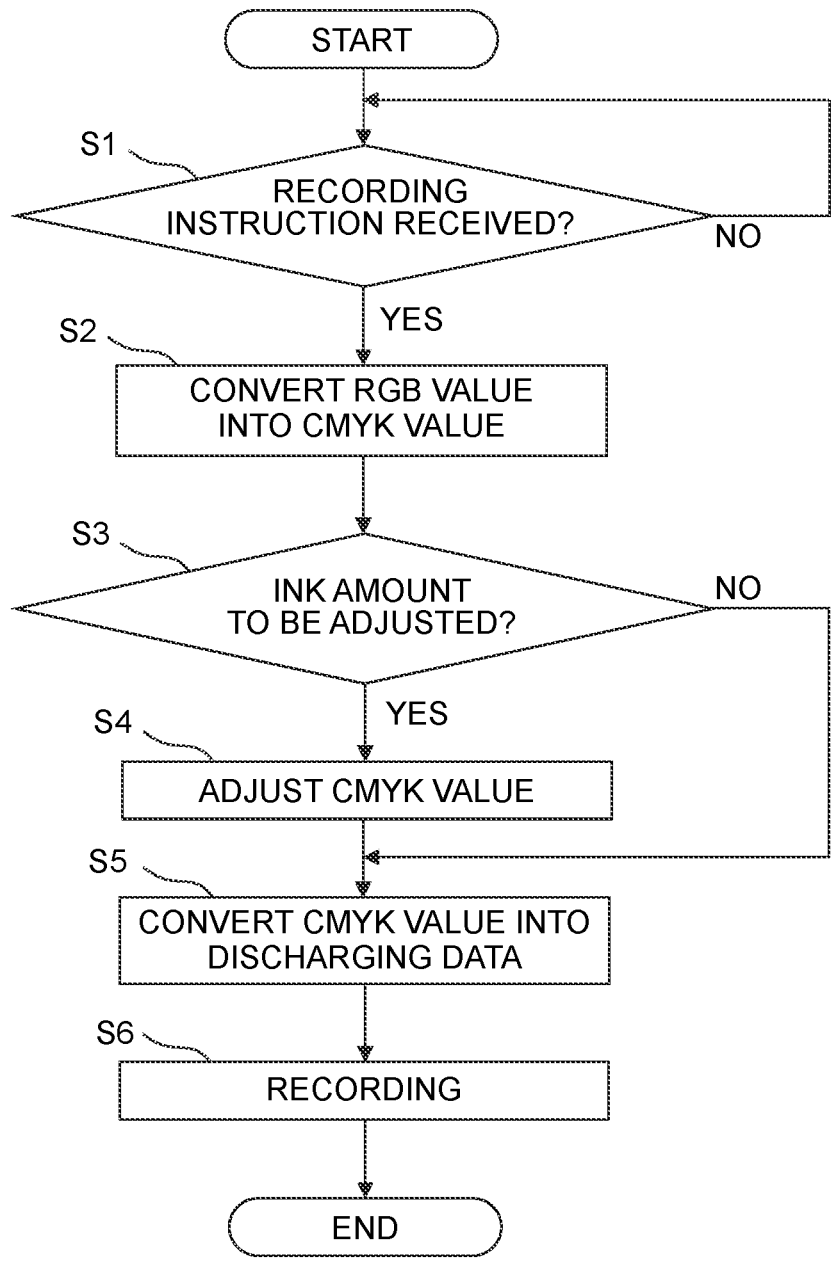

RECORDING APPARATUS

REFERENCE TO RELATED APPLICATIONS

This application claims priority from Japanese Patent Application No. 2022-191285 filed on Nov. 30, 2022. The entire content of the priority application is incorporated herein by reference.

BACKGROUND ART

Conventionally, there is a known technique of adjusting the density of image data in accordance with an adjustment value.

DESCRIPTION

In a configuration wherein a controlling part (controller) of a recording apparatus is capable of controlling a recording part in a plurality of modes, there is such a case that the plurality of modes includes a mode wherein a variety of kinds of problems might occur in a case that an amount of a recording material is small. In a case that an image to be recorded on a recording medium is an important document such as a contract, etc., and that the density of the image is low and the image is unclear, it is necessary to perform a re-recording. The variety of kinds of problems is exemplified by such a problem that the re-recording cannot be performed easily, and the like. For example, it is necessary to request a person or party, different from a user of the recording apparatus, to send or transmit the image data again.

In a case that the density of the image data (the amount of the recording material used in the recording) is made adjustable under a same condition in the plurality of modes, the problem(s) as exemplified above might occur.

An object of the present disclosure is to provide a recording apparatus configured to suppress a problem which might occur due to such a situation that the amount of the recording material is small.

According to an aspect of the present disclosure, there is provided a recording apparatus including: a recording part configured to perform a recording of an image onto a recording medium with a recording material; and a controller configured to control the recording part in a plurality of modes. The plurality of modes includes a first mode and a second mode. The controller is configured to adjust an amount of the recording material to be used at a time of the recording in the second mode. An adjustment width in a direction of decreasing the amount of the recording material in the first mode is smaller than an adjustment width in the direction of decreasing the amount of the recording material in the second mode.

FIG. 5 is a flow chart indicating an application program corresponding to a print function executed by a CPU of the multifunction peripheral 1.

FIRST EMBODIMENT

Figure 1:
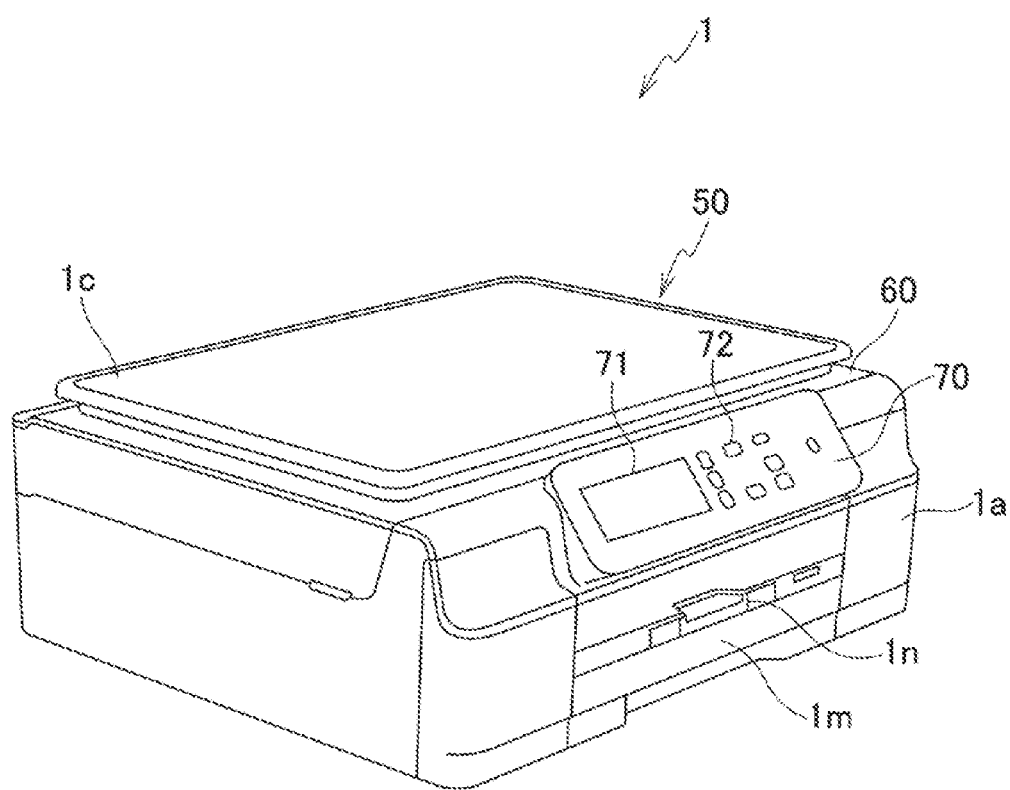
FIG. 1 is a perspective view of a multifunction peripheral 1.

A multifunction peripheral 1 according to a first embodiment of the present disclosure is provided with: a casing 1a, a reading part 50 of a flat-bed type provided on an upper part of the casing 1a, a cover 1c attached to the upper part of the casing 1a to be openable and closable, and a paper feed tray 1m and a paper discharge tray 1n which can be pulled or drawn with respect to the casing 1a, as depicted in FIG. 1. A panel 70 is provided on a front surface of the casing 1a. The term "front surface" means a surface on the downstream side in a conveying direction. The panel 70 includes a display 71 of a touch-panel system and operation buttons 72.

Figure 2:
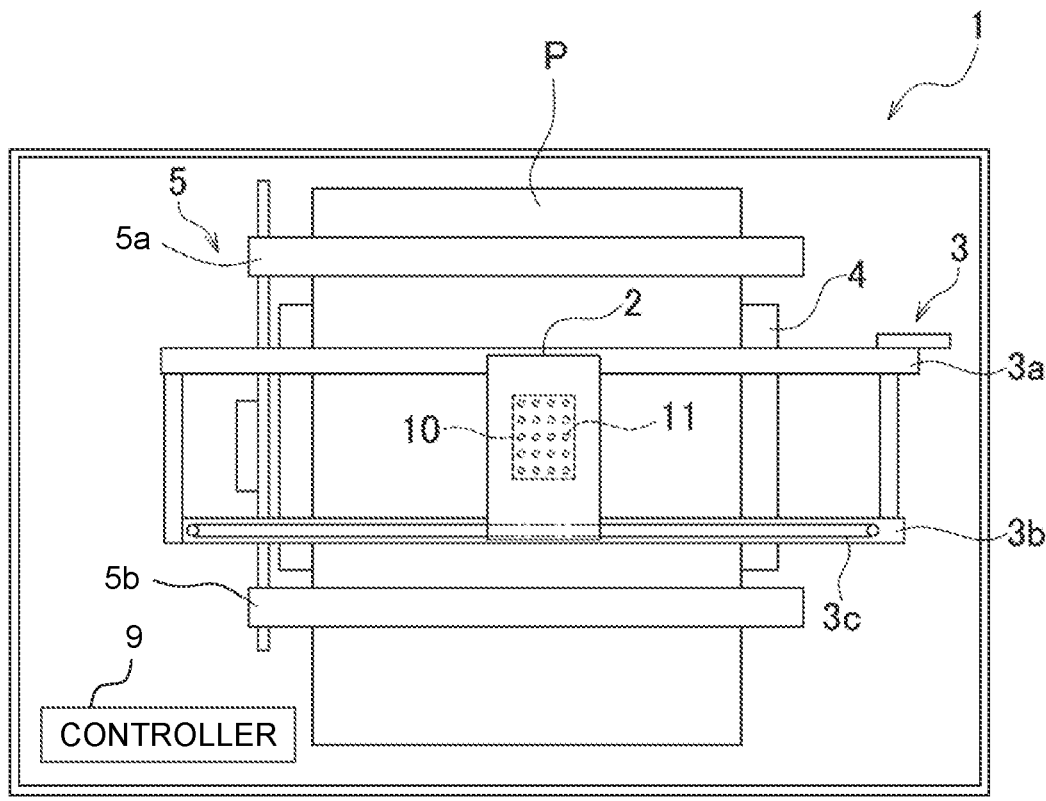
FIG. 2 is a plan view depicting the inner part of a casing of the multifunction peripheral 1.

As depicted in FIG. 2, a head 10 having a plurality of nozzles 11 in a lower surface thereof, a carriage 2 configured to hold the head 10, a scanning part 3 configured to move the carriage 2 in a paper width direction, a platen 4 configured to support a paper sheet P (paper P, sheet P) from therebelow, a conveyor 5 configured to convey the paper sheet P in the conveying direction, and a controller 9 are provided on the inside of the casing 1a.

The paper sheet P corresponds to a "recording medium" of the present disclosure, the head 10 corresponds to a "recording part" of the present disclosure, and the multifunction peripheral 1 corresponds to a "recording apparatus" of the present disclosure. The paper width direction and the conveying direction are orthogonal to a vertical direction and are orthogonal to each other.

The scanning part 3 includes a pair of guides 3a and 3b configured to support the carriage 2 and a belt 3c connected to the carriage 2. The guides 3a and 3b and the belt 3c extend in the paper width direction. In a case that a carriage motor 3M (see FIG. 3) is driven by a control of the controller 9, the belt 3c runs, which in turn moves the carriage 2 in the paper width direction along the guides 3a and 3b.

The platen 4 is arranged at a location below the carriage 2 and the head 10. The paper sheet P is placed on an upper surface of the platen 4.

The conveyor 5 has a paper feed roller (not depicted in the drawings) provided on the paper feed tray 1m (see FIG. 1) and two roller pairs 5a and 5b. The head 10, the carriage 2 and the platen 4 are arranged between the roller pair 5a and the roller pair 5b in the conveying direction. In a case that a conveying motor 5M (see FIG. 3) is driven by a control of the controller 9, the paper sheet P arranged in the paper feed tray 1m (see FIG. 1) is fed by the paper feed roller and then is conveyed in the conveying direction by the roller pairs 5a and 5b, passes a location below the head 10 and is received by the paper discharge tray 1n (see FIG. 1).

Figure 3:
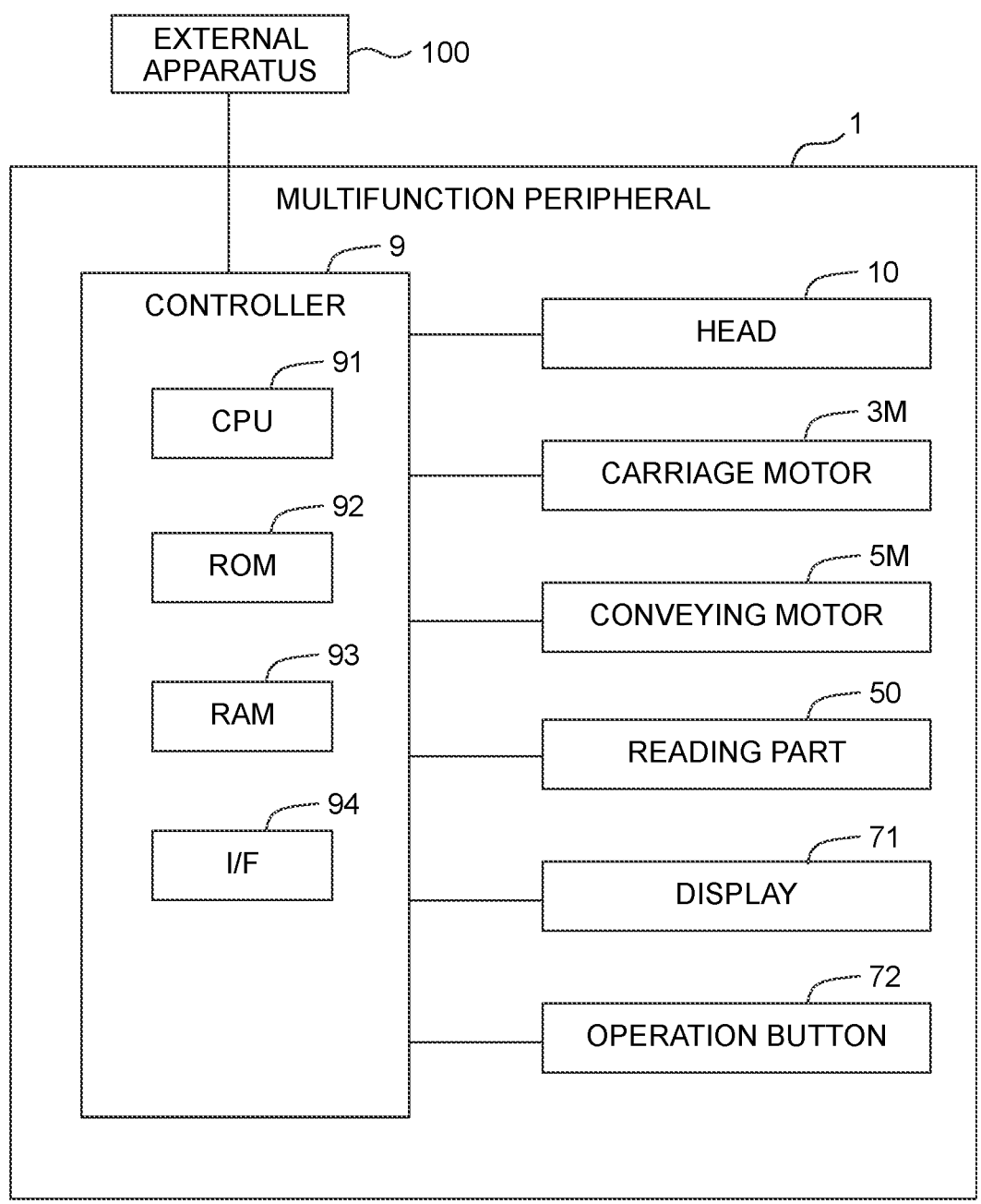
FIG. 3 is a block diagram depicting the electrical configuration of the multifunction peripheral 1.

As depicted in FIG. 3, the controller 9 has a CPU (Central Processing Unit) 91, a ROM (Read Only Memory) 92, a RAM (Random Access Memory) 93 and I/F (Interface) 94. A program, data, etc., by which the CPU 91 performs a variety of kinds of control are stored in the ROM 92. The RAM 93 temporarily stores data used by the CPU 91 in a case that the CPU 91 executes a program. The I/F 94 performs transmittance and receipt of data with outside (an external apparatus).

The CPU 91 executes a recording control based on data (including image data indicating an image) received by the I/F 94 and in accordance with the program, the data, etc., stored in the ROM 92 and/or the RAM 93. The recording control is a control regarding a recording of an image on (to)

the paper sheet P, and includes a conveying processing of causing the paper sheet P to be conveyed by the conveyor 5 in the conveying direction by a predetermined amount, and a scanning processing of causing an ink to be discharged or ejected from the plurality of nozzles 11 with respect to the paper sheet P, while causing the head 10 to be moved in the paper width direction by the scanning part 3. With this, dots of the ink are formed on the paper sheet P and the image is recorded.

The controller 9 including the CPU 91 corresponds to a "controller" of the present disclosure, the RAM 93 corresponds to a "memory" of the present disclosure, and I/F 94 corresponds to a "receiving part" of the present disclosure.

The reading part 50 has a manuscript table (original table) 60 (see FIG. 1) constructed of the upper part of the casing 1a and a reading unit (not illustrated in the drawings) provided on the inside of the casing 1a. In a state that the cover 1c is opened, a manuscript (original) is placed on the original table 60. Afterwards, the cover 1c is closed to thereby suppress any entrance of a light from outside into the reading unit. Image data of the manuscript read by the reading unit is transmitted to the controller 9.

The multifunction peripheral 1 has: a scan function of reading an image of the manuscript by the reading part 50, a copy function of recording, on the paper sheet, P the image read by the reading part 50; a facsimile function of recording, on a paper sheet P, an image based on facsimile data received from an external apparatus 100; and a print function of recording, on a paper sheet P, an image based on a recording instruction received from the external apparatus 100.

Figure 4A:
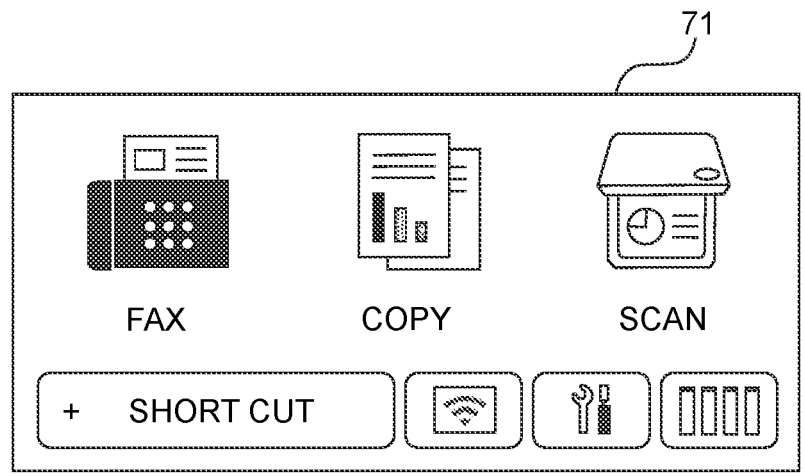
FIGS. 4A and 4B are each a schematic view depicting an example of a screen displayed on a display 71 of the multifunction peripheral 1.

In response to a user touching an icon regarding a function, desired by the user, among icons (see FIG. 4A) which are displayed on the display 17 and each of which indicates one of the scan function, the copy function and the facsimile function, the CPU 91 executes an application program corresponding to the desired function. Regarding the print function, in response to the recording instruction received from the external apparatus 100, the CPU 91 executes an application program corresponding to the print function.

The CPU 91 is capable of controlling the head 10 in each of modes corresponding to one of the respective application programs. The modes include a facsimile mode corresponding to the facsimile function and a print mode corresponding to the print function. The facsimile mode corresponds to a "first mode" of the present disclosure, and the print mode corresponds to a "second mode" of the present disclosure.

The print mode is a mode of causing image data received by the I/F 94 to be stored in the RAM 93 and of performing a recording by the head 10 based on the image data read from the RAM 93. The facsimile mode is a mode of performing a recording by the head 10 based on the image data received by the I/F 94, without causing the RAM 93 to store the image data.

In the present embodiment, although an amount of the ink (ink amount) which is to be used during the recording is adjustable in the print mode, the amount of the ink to be used during the recording is not adjustable in the facsimile mode. An adjustment width in a direction of decreasing the amount of the ink in the facsimile mode is 0 (zero) and is smaller than an adjustment width in the direction of decreasing the amount of the ink in the print mode.

Figure 4B:
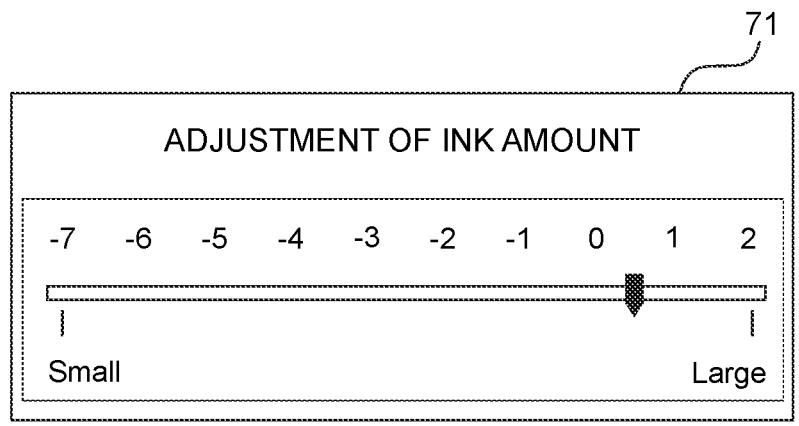

In response to the user instructing a desired amount of the ink in an ink amount adjusting screen (see FIG. 4B), the CPU 91 adjusts the amount of the ink to be used during the recording in the print mode. In the facsimile mode, either the ink amount adjusting screen (see FIG. 4B) is not displayed on the display 71 or even though the ink amount adjusting screen (see FIG. 4B) is displayed on the display 71 and that the user instructs a desired amount of the ink, the CPU 91 does not execute the adjustment of the amount of the ink.

Here, an explanation will be given about the application program corresponding to the print function, with reference to FIG. 5.

Firstly, the CPU 91 determines as to whether or not the recording instruction is received from the external apparatus 100 (step S1).

In a case that the CPU 91 determines that the recording instruction is not received from the external apparatus 100 (step S1: NO), the CPU 91 repeats the processing of step S1.

In a case that the CPU 91 determines that the recording instruction is received from the external apparatus 100 (step S1: YES), the CPU 91 converts an RGB (Red, Green, Blue) value corresponding to a color of an image indicated by the image data included in the recording instruction into a CMYK value corresponding to a color of the ink (step S2: first conversion processing). The RGB value corresponds to a "pixel value" of the present disclosure, and the CMYK value corresponds to a "density value" of the present disclosure.

After the processing of step S2, the CPU 91 determines as to whether or not the adjustment of the amount of the ink is to be performed, based on a signal from the display 71 (see FIG. 4B) (step S3).

In a case that the CPU 91 determines that the adjustment of the amount of the ink is not to be performed (step S3: NO), the CPU 91 proceeds the processing to the processing of step S5.

In a case that the CPU 91 determines that the adjustment of the amount of the ink is to be performed (step S3: YES), the CPU 91 adjusts the CMYK value obtained in step S2 based on an adjustment value indicated by the above-described signal (step S4), and then the CPU 9 proceeds the processing to the processing of step S5.

In the processing of step S5, the CPU 91 converts the CMYK value into discharge data (step S5: second conversion processing). The discharge data indicates a volume (any one of a large droplet, intermediate (middle) droplet, a small droplet and zero) of the ink to be discharged from each of the plurality of nozzles 11 per one recording cycle (a time required for the paper sheet P to move relative to the head 10 by a unit distance corresponding to a resolution of the image to be formed on the paper sheet P).

In a case that the adjustment in the direction of decreasing the amount of the ink is performed, it is allowable that, in a certain recording cycle, the volume of the ink is changed from the large droplet to the middle droplet or the volume of the ink is changed from the middle droplet to the small droplet. Further, in a case that the adjustment in a direction of increasing the amount of the ink is performed, it is allowable that, in a certain recording cycle, the volume of the ink is changed from the middle droplet to the large droplet, or the volume of the ink is changed from the small droplet to the middle droplet.

After the processing of step S5, the CPU 91 controls the conveyor 5, the scanning part 3 and the head 10 so as to record the image on the paper sheet P (step S6). After the processing of step S6, the CPU 91 ends this program.

As described above, according to the present embodiment, the adjustment width in the direction of decreasing the amount of the ink in the facsimile mode is smaller than the adjustment width in the direction of decreasing the amount of the ink in the print mode. With this, it is possible to suppress a variety of kinds of problems which might occur in a case that the amount of the ink is small in the facsimile mode. The variety of kinds of problems is exemplified, for example, by such a problem that in a case that an image to be recorded on the paper sheet P is an important document such as a contract, etc., and that the density of the image is low and unclear, a re-recording is required to be performed, whereas the re-recording cannot be performed easily, and the like.

The CPU 91 is not capable of adjusting the amount of the ink in the facsimile mode. In this case, it is possible to suppress, in a more ensured manner, the variety of kinds of problems which might occur in a case that the amount of the ink is small in the facsimile mode.

The facsimile mode is the mode of performing the recording by the head 10 based on the image data received by the I/F 94, without causing the RAM 93 to store the image data. In a case that a re-recording is required in this mode, it is necessary to request a person or party, different from the user of the multifunction peripheral 1, to send or transmit the image data again, due to which the re-recording cannot be executed easily. By making the adjustment width in the direction of decreasing the amount of the ink to be small (to be 0 (zero) in the present embodiment) in such a case, it is possible to prevent a situation requiring the re-recording, in advance.

In the facsimile mode, since it is relatively often that the important document such as a contract is recorded and a clear image is required, the re-recording is more likely to be necessary in a case that the amount of the ink is small. By making the adjustment width in the direction of decreasing the amount of the ink to be small (to be 0 (zero) in the present embodiment) in such a case, it is possible to prevent a situation requiring the re-recording, in advance.

In a case that the amount of the ink is to be adjusted in the print mode, the CPU 91 performs an adjustment processing of the amount of the ink (step S4) after the CPU 91 has converted the RGB value into the CMYK value (step S2), and before the CPU 91 converts the CMYK value into the discharge data (step S5), as depicted in FIG. 5. In a case that the adjustment processing is performed before the processing of step S2, any deviation in the hue is more likely to occur. On the other hand, in a case that the adjustment processing is performed after the processing of step S5, the adjustment is more likely to be extreme. In the present embodiment, by performing the adjustment processing after the processing of step S2 and before the processing of step S5, it is possible to appropriately adjust the amount of the ink, while suppressing any deviation in the hue and/or any extreme adjustment.

Second Embodiment

Next, a second embodiment of the present disclosure will be explained.

In the first embodiment, the amount of the ink is not adjustable in the facsimile mode. In contrast, in the second embodiment, although it is not possible to perform the adjustment in the direction of decreasing the amount of the ink in the facsimile mode, the adjustment in the direction of increasing the amount of the ink is possible in the facsimile mode.

According to the second embodiment, since it is not possible to perform the adjustment in the direction of decreasing the amount of the ink in the facsimile mode, it is possible to suppress the variety of kinds of problems which might occur in the case that the amount of the ink is small; and since it is possible to perform the adjustment in the direction of increasing the amount of the ink in the facsimile mode, it is possible to make the amount of the ink to be great and to record a clear image.

Third Embodiment

Next, a third embodiment of the present disclosure will be explained.

In the first embodiment, the amount of the ink is not adjustable in the facsimile mode. In contrast, in the third embodiment, it is possible to perform, in the facsimile mode both of the adjustment in the direction of decreasing the amount of the ink and the adjustment in the direction of increasing the amount of the ink.

Figure 6:
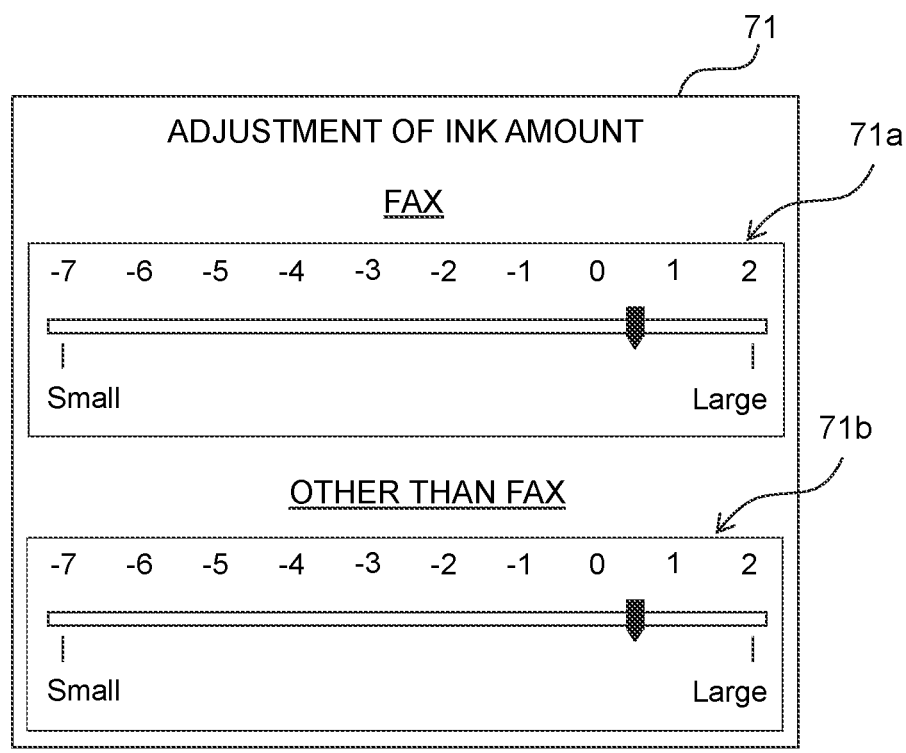
FIG. 6 is a schematic view depicting an example of a screen displayed on a display 71 of a multifunction peripheral.

In the third embodiment, as depicted in FIG. 6, ink amount adjusting screens 71*a* and 72*b* in both of a case of facsimile and a case other than (different from) the facsimile is displayed on the display 71. The user is capable of instructing a desired ink amount in each of the ink amount adjusting screens 71*a* and 71*b*. The ink amount adjusting screen 71*a* corresponds to a "first input part" via which data indicating an adjustment value of the amount of the ink in the facsimile mode is input. The ink amount adjusting screen 71*b* corresponds to a "second input part" via which data indicating an adjustment value of the amount of the ink in the print mode is input.

The CPU 91 adjusts the amount of the ink in the facsimile mode based on the adjustment value input via the ink amount adjustment screen 71*a*. Further, the CPU 91 adjusts the amount of the ink in the print mode based on the adjustment value input via the ink amount adjustment screen 71*b*.

Here, in a case that the adjustment value input via the ink amount adjustment screen 71*a* and the adjustment value input via the ink amount adjustment screen 71*b* are both the adjustment values in the direction of decreasing the amount of the ink and that the adjustment value input via the ink amount adjustment screen 71*a* and the adjustment value input via the ink amount adjustment screen 71*b* are mutually same, the CPU 91 makes the amount of the ink in the facsimile mode to be greater than the amount of the ink in the print mode.

For example, in a case that "−2" is instructed, as an adjustment amount of the ink in each of the ink amount adjustment screens 71*a* and 71*b*, the CPU 91 makes the amount of the ink to be "20%" smaller, with respect to an initial value, in the print mode, whereas the CPU 91 makes the amount of the ink to be "5%" smaller, with respect to the initial value, in the facsimile mode. Namely, the adjustment width in the direction of decreasing the amount of the ink in the facsimile mode is smaller than adjustment width in the direction of decreasing the amount of the ink in the print mode.

According to the third embodiment, in the facsimile mode, although the amount of the ink is adjustable, the adjustment width in the direction of decreasing the amount of the ink is made small, thereby making it possible to suppress the variety of kinds of problems which might occur in the case that the amount of the ink is small in the facsimile mode. Further, even in a case that the contents of display are not made mutually different between the ink amount adjustment screens 71*a* and 71*b*, it is possible to suppress the above-described problems by making the adjustment width in the direction of decreasing the amount of the ink in the facsimile mode to be smaller than the adjustment width in the direction of decreasing the amount of the ink in the print mode, thereby making it possible to prevent the configuration from becoming complex.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

MODIFICATION

In the foregoing, although the embodiments of the present disclosure have been explained, the present disclosure is not limited to or restricted by the above-described embodiments; a various kinds of design change can be made to the present disclosure within the range described in the claims.

In the above-described embodiments, although the adjustment processing of the amount of the ink in each of the facsimile mode and the print mode has been explained, it is allowable, for example, to perform an adjustment processing, in a copy mode corresponding to the copy function, in a similar manner to that in the print mode.

The first mode is not limited to or restricted by being the facsimile mode, and the first mode may include a bar code mode of recording a bar code on a recording medium. In a case that a bar code is to be recorded and that an amount of a recording material is small, a recorded image becomes to be unclear, and particularly dots in an edge part of the bar become small, which in turn might cause such a problem that the bar code cannot be read appropriately. The present disclosure directed to suppressing the above-described problem.

In the above-described embodiments, although the facsimile mode corresponds to the first mode and the print mode corresponds to the second mode, the present disclosure is not limited to this. For example, there is such a case that the facsimile mode has two modes which are modes A and B. The mode A is a mode of performing a recording by the head 10 based on the image data received by the I/F 94, without causing the RAM 93 to store the image data. The mode B is a mode of causing the RAM 93 to store image data received by the I/F 94 and of performing a recording by the head 10 based on the image data read from the RAM 93. In this case, it is allowable to perform the above-described control, provided that the mode A corresponds to the first mode, and that the mode B corresponds to the second mode.

In the above-described embodiments, although the input part is constructed of the display part 71 of the touch system, the input part may be an input part of a voice input system.

In the above-described embodiments, although the recording material is the ink, it is allowable that the recording material is a liquid different from the ink (for example, a treatment liquid which agglutinates or precipitates constituents in the ink, etc.). Further, the recording material is not limited to a liquid such as the ink, and may be a toner, etc.

In the above-described embodiments, although the recording part is of the serial system, the recording part may be of a line system. Further, the recording part is not limited to being of the liquid discharging (ejecting) system, and may be of a laser system, a thermal transfer system, etc.

The recording medium is not limited to the sheet or paper, and may be a cloth, a substrate, a plastic member, etc.

The recording apparatus according to the present disclosure is not limited to the multifunction peripherals. For example, the recording apparatus according to the present disclosure may be an apparatus which has a recording part but does not have a reading part.

What is claimed is:

1. A recording apparatus comprising:
   a recording part configured to perform a recording of an image onto a recording medium with a recording material; and
   a controller configured to control the recording part in a plurality of modes, wherein
   the plurality of modes includes a first mode and a second mode,
   the controller is configured to adjust an amount of the recording material to be used at a time of the recording in the second mode, and
   an adjustment width in a direction of decreasing the amount of the recording material in the first mode is smaller than an adjustment width in the direction of decreasing the amount of the recording material in the second mode.

2. The recording apparatus according to claim 1, wherein the controller is configured not to adjust the amount of the recording material in the first mode.

3. The recording apparatus according to claim 1, further comprising:
   a receiving part configured to receive image data indicating the image; and
   a memory configured to store the image data, wherein
   the second mode is a mode of causing the memory to store the image data received by the receiving part and of performing the recording, by the recording part, based on the image data read from the memory, and
   the first mode is a mode of performing the recording, with the recording part, based on the image data, without causing the memory to store the image data received by the receiving part.

4. The recording apparatus according to claim 3, wherein the first mode includes a facsimile mode.

5. The recording apparatus according to claim 1, wherein the controller is configured to perform, in the first mode, an adjustment in a direction of increasing the amount of the recording material.

6. The recording apparatus according to claim 1, further comprising:
   a first input part configured to be input an adjustment value of the amount of the recording material in the first mode; and
   a second input part configured to be input an adjustment value of the amount of the recording material in the second mode, wherein
   wherein the controller is configured to:
      adjust the amount of the recording material in the first mode, based on the adjustment value input into the first input part; and
      adjust the amount of the recording material in the second mode, based on the adjustment value input into the second input part, and in a case that each of the adjustment value input into the first input part and the adjustment value input into the second input part is an adjustment value in the direction of decreasing the amount of the recording material and that the adjustment value input into the first input part and the adjustment value input into the second input part are mutually same, the controller is configured to make the amount of the recording material in the first mode to be greater than the amount of the recording material in the second mode.

7. The recording apparatus according to claim 1, wherein the controller is configured to execute:
   conversion of a pixel value of the image into a density value corresponding to a density of the recording material; and
   conversion of the density value into data indicating the amount of the recording material, and
after the controller has performed the conversion of the pixel value of the image into the density value corresponding to the density of the recording material and before the controller performs the conversion of the density value into the data indicating the amount of the recording material, the controller is configured to adjust the density value based on an adjustment value.

* * * * *